(12) United States Patent
Barr

(10) Patent No.: US 6,599,004 B2
(45) Date of Patent: Jul. 29, 2003

(54) EXTRUDER SCREW WITH IMPROVED ENERGY EFFICIENT MELTING

(76) Inventor: Robert A. Barr, P.O. Box 4476, Virginia Beach, VA (US) 23454

(*) Notice: Subject to any disclaimer, the term of this patent is extended or adjusted under 35 U.S.C. 154(b) by 0 days.

(21) Appl. No.: 09/848,699

(22) Filed: May 3, 2001

(65) Prior Publication Data

US 2002/0163853 A1 Nov. 7, 2002

(51) Int. Cl.⁷ .................................. B29B 7/42
(52) U.S. Cl. .................................... 366/88; 366/89
(58) Field of Search ................... 366/79–85, 88–90, 366/318, 319, 322–324; 425/204, 208, 209

(56) References Cited

U.S. PATENT DOCUMENTS

| | | | |
|---|---|---|---|
| 3,487,503 A | | 1/1970 | Barr et al. |
| 3,698,541 A | * | 10/1972 | Barr |
| 3,867,079 A | * | 2/1975 | Kim |
| 4,000,884 A | | 1/1977 | Chung |
| 4,128,341 A | | 12/1978 | Hsu |
| 4,173,417 A | | 11/1979 | Kruder |
| 4,277,182 A | * | 7/1981 | Kruder |
| 4,341,474 A | * | 7/1982 | Wheeler, Jr. et al. |
| 4,356,140 A | | 10/1982 | Kruder |
| 4,405,239 A | | 9/1983 | Chung et al. |
| 4,786,181 A | * | 11/1988 | O'Brien |
| 4,925,313 A | | 5/1990 | Nunn |
| 5,035,509 A | | 7/1991 | Kruder |
| 5,141,326 A | * | 8/1992 | Eshima |
| 5,342,125 A | | 8/1994 | Myers |
| 5,599,097 A | | 2/1997 | Christie |
| 6,056,430 A | | 5/2000 | Medici, Jr. et al. |
| 6,132,075 A | | 10/2000 | Medici, Jr. et al. |
| 6,139,179 A | * | 10/2000 | Christiano et al. |

* cited by examiner

Primary Examiner—Charles E. Cooley
(74) Attorney, Agent, or Firm—MacMillan, Sobanski & Todd, LLC

(57) ABSTRACT

An extruder screw includes an energy transfer section divided into successive barrier sections in which a channel formed by a first thread is divided into at least two sub-channels by a second thread. A ratio of the difference in outer diameters of the threads is approximately inversely proportional to the ratio of the lengths of adjacent ones of the barrier sections.

20 Claims, 3 Drawing Sheets

EXTRUDER SCREW WITH IMPROVED ENERGY EFFICIENT MELTING

BACKGROUND OF THE INVENTION

This invention relates to an improved screw for use in an extruder for working a wide range of solid materials into a substantially homogeneous, molten state suitable for formation into a multitude of desired shapes by extrusion or injection into a die, mold, or casting form. More particularly, the improved screw of the present invention is most readily incorporated into what is known as a single screw extruder.

Extruder screws are used for transforming solid materials into a molten mixture for subsequent use in a mold or die via extrusion or injection. Materials that are used for this purpose include a range of plastic materials, as well as various metal or thixotropic materials. The screw consists of a generally cylindrical body with at least one helical thread formed thereon. The outer diameter of the thread is known as the main diameter of the screw, and the areas between the main diameters are known as channels of the screw. The opposing ends of the screw are known as the feed end, where the solid material is introduced, and the discharge end, where the molten material is delivered.

Extrusion, injection molding or blow molding with a single screw extruder, includes feeding the solid material in pellet, chip, powder, or flake form to the feed end of the extruder through a hopper or similar device mounted on an opening of a heated cylindrical barrel. The extruder screw is rotatably mounted and received in the barrel. The screw thread maintains a minimum clearance to the barrel and the material is moved downstream through the channel from the feed end to the discharge end by forces exerted by the rotation of the screw. The solid material fed into the screw channel is compacted into a solid plug or solid bed and the solid bed melts as it travels down the screw channel. The solid bed melts in at least two ways, including by shear melting and conductive melting. Shear melting is caused by the forces exerted by the screw on the solid bed or melt pool. Conductive melting occurs from the transfer of heat from the barrel heaters and when cooler solid pieces of the material come in contact with the hotter liquid melt pool. While these melting types encountered in extruder screw operation occur in most materials, shear melting is generally more common in plastic materials, while conductive melting is generally more common in metal or thixotropic materials.

The molten material is collected by the wiping action of the thread into a melt pool. The melt pool gradually increases as the solid bed gradually melts, eventually occupying the entire screw channel. The best extrusion and injection results are achieved when only molten material is delivered at a desired temperature at the discharge end of the screw. Molten polymers, however, have a very high viscosity and a large amount of heat is generated in the melt pool due to shearing of the melt pool by the rotation of the screw. Thus, the melt pool becomes hotter as it travels down the screw channel and often becomes undesirably hot by the time it reaches the discharge end. Increased heat transfer from the molten material in the melt pool to the solid material in the solid bed is highly desirable in order to reduce the temperature of the molten material discharged from the extruder, increase melting capacity of the extruder and increase the energy efficiency of the extrusion process.

The U.S. Pat. No. 3,487,503 shows an extruder that uses pegs machined into the channel closest to the discharge end of the screw to promote breaking up the solid bed. The U.S. Pat. No. 4,173,417 shows an extruder screw that also increases heat transfer from the melt pool to the solid bed by introducing a second thread that creates sub-channels within the screw channel, but this induces back flow of the solid materials in the opposite direction of the screw rotation.

Extruder screws of the type utilizing sub-channels are typically divided into three sections along the length of the screw. The first section is a feed section having a constant root diameter, where the solid material is introduced to the screw. The second section is the taper section, where the area in which the solid bed travels is gradually reduced by reducing the depth of the channel and where the majority of the melting of the solid occurs. It is in this section where a portion of the screw channel defined by the thread is divided into two sub-channels by a second thread to define a "barrier section". The third section is the metering section, which is similar to the feed section in that it has a constant root diameter, and which delivers the molten material in a constant amount for extrusion or injection. The thread that begins in the feed section and continues into the taper section is known as the wiping thread or main flight. It is this thread that has the minimum clearance to the barrel, and provides the force for moving the material down the length of the extruder screw. The thread that divides the channel into sub-channels is known as a barrier thread because it acts as a barrier that prevents solid particles from passing between the sub-channels. The difference in the diameters of the barrier thread and the wiping thread is known as the barrier clearance.

The U.S. Pat. No. 4,405,239 (the '239 patent) shows a screw with an energy transfer section between the taper and metering sections. The energy transfer section has a barrier thread that creates a sub-channel within the screw channel. The screw allows the solids particles and the melt pool to flow in a single direction by alternating which thread is used as the wiping thread—the thread with the minimum barrel clearance that moved the material towards the feed end. The depth of each of the sub-channels is varied as in the prior art so as to promote the flow of materials from one sub-channel to the other. This depth variation occurs throughout the length of the sub-channels. As the depth in one sub-channel increases, the other decreases—a pattern that is repeated throughout the length of the screw's energy transfer section. In addition, the clearances of the threads are interrupted in relation to the variation in sub-channel depth to increase the back flow noted above. At the point where the depth of the channels is reversed, the threads diameters are also reversed, such that the wiping thread's clearance is reduced so that the wiping thread becomes the barrier thread, and the barrier thread's clearance is increased so that the barrier thread becomes the wiping thread. The point at which the threads reverse or convert is the beginning of a barrier section. The thread clearances do not vary in the undulating manner of the sub-channel depth. Instead, there is a quick drop-off from the minimum barrel clearance of the wiping thread to the lesser clearance of the barrier thread, or vice versa. Farther downstream another reversal takes place, defining another barrier section, and the threads resume their original functions. These thread reversals or conversions take place throughout the length of the energy transfer section.

The '239 patent also discloses barrier sections that are identical both in length and barrier clearance, that is, the clearance between the wiping thread and the barrier thread is constant throughout the screw's energy transfer section such that the size of the particles that could pass between the sub-channels is constant throughout the length of the screw's energy transfer section. Constant length and clearance sections have inherent limitations in promoting conductive melting because while mixing is promoted, constant clearances and lengths allow the same size material to pass regardless of its location in the energy transfer section. The refining or dispersion of the melt can be improved by varying the length and clearance of the energy transfer sections so as to only allow smaller and smaller particles to move down the length of the screw. Improvements in the efficiency of conductive melting without sacrificing the flow rate of the materials through the screw remains a continuing goal of extruder screw design. It remains very desirable to increase conductive melting without sacrificing the flow rate or energy efficiency of the screw.

It is an objective of this invention to achieve a gradual increase in the refining or dispersion of the melt by increased shear on the melt as it moves downstream over the clearances without sacrificing the flow rate through the extruder screw.

It is a further objective of the invention to achieve greater conductive melting in an extruder screw caused by greater mixing of the unmelted solids with the melt stream regardless of the type of solids being processed.

SUMMARY OF THE INVENTION

The present invention accomplishes the objectives noted above by making a novel improvement upon the sub-channel depth variation methodology utilized in the U.S. Pat. No. 4,405,239. The sub-channels depth and the thread clearances both vary as in the '239 patent. The present invention, however, recognizes that greater conductive melting can be accomplished by forcing larger solid particles to remain in the melt stream and not be moved farther downstream until reduced in size. It further recognizes that a flow rate reduction may result by forcing these larger particles to remain in the barrier sections for a longer period of time. The present invention will prove particularly useful for processing those materials, such as metals or thixotropic materials, where the majority of melting that occurs is by conductive melting rather than by shear melting. The present invention will also help in continuing to ensure that only liquid material is delivered to the meter section of the extruder screw.

The prior art barrier sections and barrier clearances remain constant throughout the length of the screw's energy transfer section. The present invention's improvement lies in gradually reducing the barrier clearances while proportionately increasing the length of the barrier sections. More specifically, the barrier thread's barrier clearance reduction is inversely proportional to the increase in the length of the barrier section. The length of the barrier section is the distance along the screw between the points where the barrier thread and the wiping thread reverse functions. The number of thread turns, or the distance along the screw, it takes to complete the reversal increases through each section. Larger particles may pass into the first barrier section, but will be too large to enter the next section. Larger particles will not be able to pass through the barrier clearance into the other sub-channel when the sub-channel area decreases, which increases the conductive melting of these particles in the melt pool of that section. Because larger particles are allowed into and remain longer in the barrier section, the overall length of the barrier section is increased to allow the particles longer time to traverse the length of the barrier section and again increase the likelihood of conductive melting. By increasing the length of the barrier sections in an inverse proportion to the reduction in the sub-channel clearances, the flow rate of the screw is not compromised.

The barrier clearance, then, actually tapers or reduces along the length of the extruder screw energy transfer section, in a similar manner as the channel depth tapers in the taper section. The process is repeated through each successive barrier section, until only liquid material passes to the meter section of the extruder screw. As a result of these improvements, better conductive melting is accomplished, the refinement and dispersion of the melt is increased, and more types of solid material may be used, whilst the flow and efficiency of the extruder screw remain unaffected.

DESCRIPTION OF THE DRAWINGS

The above, as well as other advantages of the present invention, will become readily apparent to those skilled in the art from the following detailed description of the preferred embodiments when considered in light of the accompanying drawings in which.

DETAILED DESCRIPTION OF THE PREFERRED EMBODIMENT

Figure 1:
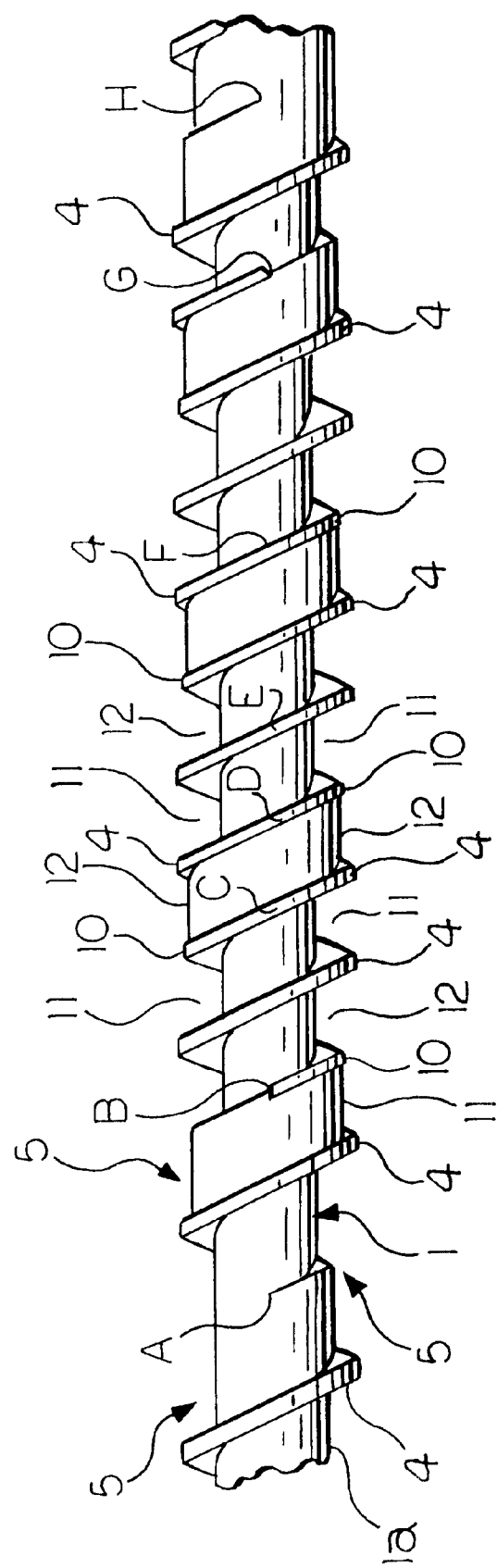
FIG. 1 is a fragmentary schematic view of the screw structure shown in FIG. 2 of the U.S. Pat. No. 4,405,239.

Consideration of the components of a single screw extruder relevant to the present invention, the general structure of a typical screw and the function of a screw will be helpful in understanding and appreciating the novel screw structure of the present invention. FIG. 1 corresponds to FIG. 2 of the U.S. Pat. No. 4,405,239, which patent is herein incorporated by reference. A prior art extruder screw 1 is adapted to be rotatably mounted and received inside a cylindrical barrel (not shown) provided with a hopper (not shown) mounted in an opening of the barrel at the feed end of the extruder. The screw 1 has at least one helical wiping thread 4 with a minimum clearance to the barrel (not shown) integrally mounted or formed on a core 1a. A thread 4 creates a helical channel 5 radially extending around the core 1a of the screw 1. The axial distance of one turn of the thread 4 is called "pitch". A second undercut or barrier thread 10, which has a larger clearance to the barrel, splits the channel 5 into two sub-channels, a front sub-channel 11 and a back sub-channel 12. The difference in radial distance between the first thread 4 and the second thread 10 is called "barrier clearance."

The sub-channels begin at a point A, with the front sub-channel 11 starting to gradually decrease its depth while the back sub-channel 12 starts to gradually increase its depth. The second thread 10, of the same pitch as the thread 4, originates at a point B rising from the floor of the channel 5. At a point C, the front sub-channel 11 is at a maximum depth, the back sub-channel 12 is at a minimum depth (peak clearance), and the second thread 10 converts to the first thread 4. Conversely, at a point D, the first thread 4 converts to the second thread 10. The front sub-channel 11 is maintained at the maximum depth from the point C to a point E. Between the point D and a point F, the screw 1 can have the same configuration as between the point B and the point D. At a point F, the first thread 4 converts back to the second thread 10 which then terminates at a point G. Between the point F and the point G, the screw 1 can have the same configuration as between the point B and the point D and this configuration can repeat. The sub-channels 11 and 12 end at a point H and the meter section begins.

The thread conversion, along with the depth variation of the sub-channels 11 and 12, as discussed in the '239 patent, aids in the mixing of the solid and liquid material. The axial distance between the beginning points of adjacent sections of the undercut channel on the screw 1 is a length of a barrier flight. Thus, the points B and C define a first barrier flight. The barrier flights of the prior art screws, as discussed above, are of constant axial length, or rather, contain the same number of turns of the threads 4 and 10 on the screw 1 for each barrier flight. Although the thread conversion points B, C, D and F are shown at roughly the same circumferential orientation of the screw 1, this is not required, and the thread conversions may occur at different points along the circumference of screw without affecting the critical features of the invention.

The barrier clearance, as noted above, is the difference in diameter between the first thread 4 and the second thread 10. Also as noted above, the first thread 4 maintains a minimum clearance to the barrel, while the second thread 10 has a larger clearance to the barrel. The barrier clearance is the same in each barrier flight.

Figure 2:
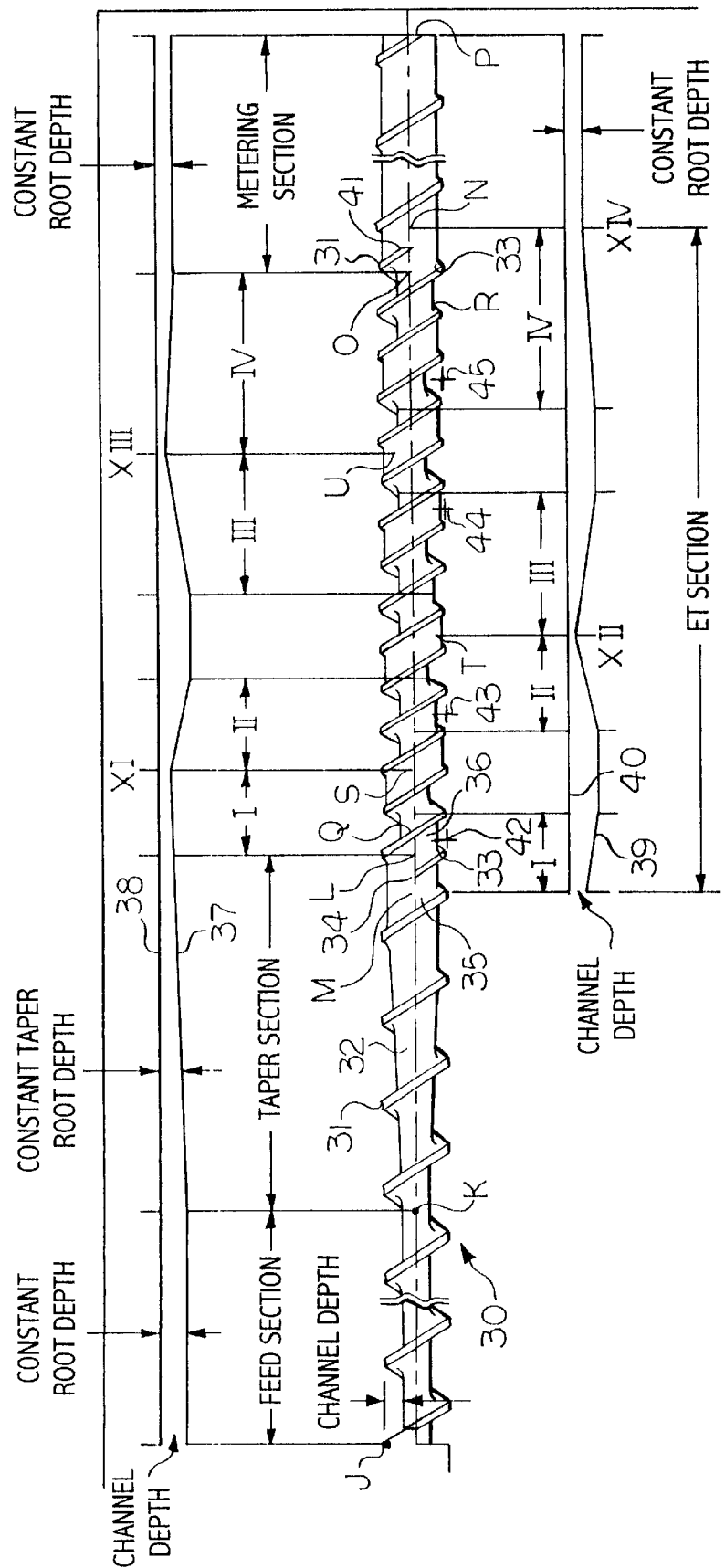
FIG. 2 is a fragmentary schematic view of a preferred screw embodying the novel screw structure of the present invention.

FIG. 2 shows an extruder screw 30 according to the present invention. The extruder screw 30 is configured to be rotatably mounted and received in a barrel (not shown) and is divided into four sections. A feed section, where the solid material is introduced, begins at a point J and continues to a point K. A taper section begins at the point K and continues to a point L. The energy transfer section, the subject of the present invention, begins at a point M just before the point L and continues to a point N. A metering section, where liquid material is delivered for extrusion, molding, etc., begins at a point O just before the point N and ends at a point P.

The extruder screw 30 has at least one helical thread 31 that defines a helical channel 32 through which the material being processed passes The thread 31 maintains a minimum clearance to the barrel. A second thread 33, of the same or different pitch as the first thread 31, but narrower in width and having a larger clearance to the barrel, has a beginning end 34 in the energy transfer section rising from the floor of the channel 32 between the points M and L. The second thread 33 divides the channel 32 into two or more sub-channels, a front sub-channel 35 and a back sub-channel 36. A depth profile 37 of the channel 32 along the length of the screw 30 and incorporating the back sub-channel 36 is shown with respect to a horizontal reference line 38, which line represents the interior surface of the wall of the barrel. A depth profile 39 of the front sub-channel 35 is shown with respect to a horizontal reference line 40, which line also represents the interior surface of the wall of the barrel.

The energy transfer section extends from the point M to the point N and is divided into four or more harrier sections, "X I" through "X IV"; each with its respective barrier clearance between the first thread 31 and the second thread 33. One barrier section ends and another starts where the threads 31 and 33 reverse functions. At a point Q, after the point L, the first thread 31 narrows in width to correspond with the width of the second thread 33. At a point R, before point O, the second thread 33 could widen to become the width of the first thread and continue through the metering section. The first thread 31 terminates at a finishing end 41 between the point O and the point N.

Figure 3:
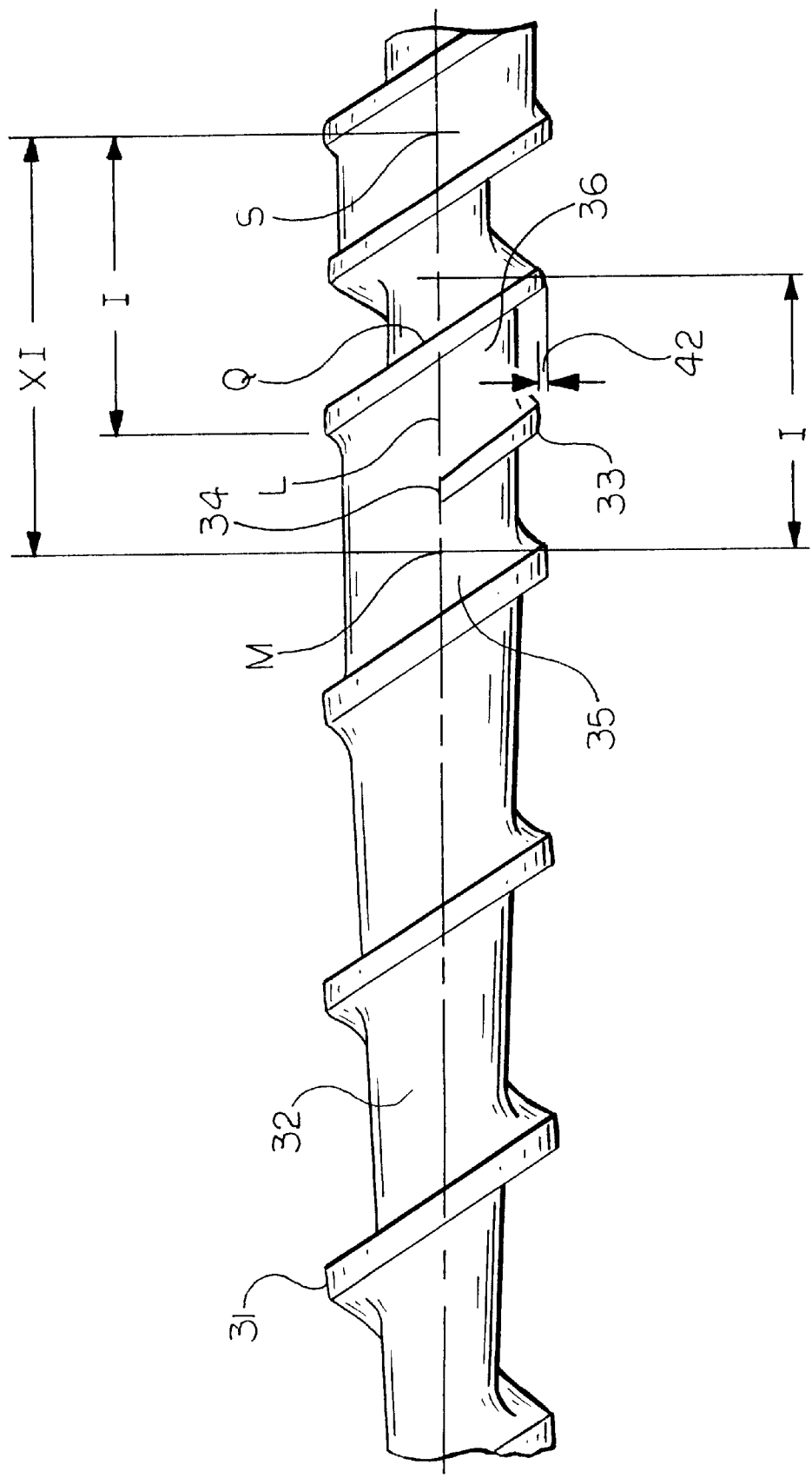
FIG. 3 is an enlarged portion of the screw shown in FIG. 2 illustrating the barrier clearance.

The first harrier section X I begins at point M and ends at a point S, and has a barrier clearance 42 as shown in FIG. 3. The second barrier section X II begins at point S and ends at a point T, and has a barrier clearance 43. The third barrier section X III begins at point T and ends at a point U, and has a harrier clearance 44. The fourth and last barrier section X IV begins at point U and ends at the point N, and has a harrier clearance 45. The portions of the depth profile 37 that vary in depth over the length of the screw are identified as "I", "II", "III" and "IV" just below the line 37 and are included in the barrier sections "X I", "X II", "X III" and "IV" respectively. The portions of the depth profile 39 that vary in depth over the length of the screw are similarly identified as "I", "II", "III" and "IV" just above the line 40 and are included in the barrier sections "X I", "X II", "X III" and "X IV" respectively.

The barrier clearances 42, 43, 44, and 45 gradually reduce throughout the length of the energy transfer section. More specifically, the first barrier clearance 42 is greater than the second barrier clearance 43, which in turn is greater ban the third barrier clearance 44, which in turn is greater than the fourth barrier clearance 45. This gradual reducing of the barrier clearance forces larger solid particles to remain in the barrier sections and tends to restrict the flow rate. The present invention addresses this issue by increasing the length of the barrier sections in an inverse proportion to the reduction in barrier clearance. The length of each barrier section, as shown in FIG. 2, gradually increases along the length of extruder screw 30 yielding longer residence times during the channel to channel blending which allows more time for conductive melting. The barrier section length is increased by increasing the number of turns of the threads 31 and 33 taken for each barrier length in an inverse proportion to the reduction in barrier clearance of that barrier length. The combination of reduced barrier clearance and increased barrier length serves to promote greater mixing of the larger particles that are forced to remain within the barrier section by the reduced barrier clearance.

The depth of the channels 32, 35, and 36, the turns of the first thread 31, the pitch and width of the thread 31 along the screw 30 and the number of barrier lengths depend upon the characteristics of the material being processed. What is important to the present invention is the above-described relationship between the reduced barrier clearances and the increased barrier lengths. The design dimensions, therefore, may be varied depending on the type of process for which the extruder screw 30 is being used, the type of material being processed, and the size of the particles being processed. For example, if the first barrier section M to S has a barrier clearance of 0.120" and a barrier length of 6", and the next or second barrier section S to T has a barrier clearance of 0.060", the second section barrier length would be 12". If the second barrier section S to T has a barrier clearance of 0.100", the second section barrier length would be 7.2". Although this example has been described in terms of increasing the length of the barrier sections in an inverse proportion to the reduction in the sub-channel barrier clearances, the ratio of the barrier clearances can approximately inversely proportional to the ratio of longitudinal lengths of the barrier sections. The barrier section length may have to be adjusted to ensure an adequate flow area to accommodate the flow rate without restriction.

The length of the barrier section is the distance along the screw between the points where the barrier thread and the wiping thread reverse functions. The number of thread turns, or the distance along the screw, it takes to complete the reversal increases through each section. Larger particles may pass into the first barrier section, but will be too large to enter the next section due to the decreased barrier clearance. Larger particles will not be able to pass through the barrier clearance into the next sub-channel section, which increases the conductive melting of these particles in the melt pool of that section. Because larger particles are allowed into and remain longer in the barrier section, the overall length of the barrier section is increased to allow the particles longer time to traverse the length of the barrier section and again increase the likelihood of conductive melting. By increasing the length of the barrier sections in an inverse proportion to the reduction in the sub-channel barrier clearances, the flow rate of the screw is not compromised.

In accordance with the provisions of the patent statues, the present invention has been described in what is considered to be its preferred embodiments. However, it should be noted that this invention may be practiced otherwise than as specifically illustrated and described without departing from its spirit or scope.

What is claimed is:

1. An extruder screw with a feed end and discharge end for use in a single screw extruder that houses the screw rotatably in a cylindrical barrel for processing solid material to a molten state, the screw comprising:
    a core extending longitudinally between the feed end and the discharge end, said core having an outer surface and including an energy transfer portion;
    a helical first thread formed on said core defining with said outer surface a channel for receiving material to be processed;
    a helical second thread formed on said core in said channel and extending over said energy transfer portion of said core, said first thread and said second thread cooperating to divide said channel into a front sub-channel and a back sub-channel in said energy transfer portion;
    said energy transfer portion having a first barrier section of a first longitudinal length in which said first thread has an outer diameter greater than an outer diameter of said second thread whereby a difference between said first thread outer diameter and said second thread outer diameter is a first barrier clearance;
    said energy transfer portion having a second barrier section between said first barrier portion and said discharge end, said second barrier section having a second longitudinal length in which said second thread has an outer diameter greater than an outer diameter of said first Thread whereby a difference between said first thread outer diameter and said second thread outer diameter is a second barrier clearance; and
    wherein a ratio of said first barrier clearance to said second barrier clearance is approximately inversely proportional to a ratio of said first longitudinal length to said second longitudinal length.

2. The extruder screw according to claim 1 wherein each of said front sub-channel and said back sub-channel varies in depth between a minimum depth and a maximum depth.

3. The extruder screw according to claim 1 wherein said energy transfer portion has at least a third barrier section between said second barrier portion and said discharge end, said third baffler section having a third longitudinal length in which said first thread has an outer diameter greater than an outer diameter of said second thread whereby a difference between said first thread outer diameter and said second thread outer diameter is a third barrier clearance, and wherein a ratio of said second barrier clearance to said third barrier clearance is approximately inversely proportional to a ratio of said second longitudinal length to said third longitudinal length.

4. The extruder screw according to claim 1 wherein said first and second barrier clearances and said first and second outer diameters are adapted for processing plastic as the solid material.

5. The extruder screw according to claim 1 wherein said first and second barrier clearances and said first and second outer diameters are adapted for processing metal as the solid material.

6. The extruder screw according to claim 1 wherein said first and second barrier clearances and said first and second outer diameters are adapted for processing thixotropic material as the solid material.

7. The extruder screw according to claim 1 wherein a width of said first thread generally corresponds to a width of said second thread in said energy transfer portion.

8. The extruder screw according to claim 7 wherein said width of said first thread in said energy transfer portion is less than another width of said first thread outside said energy transfer portion.

9. The extruder screw according to claim 1 wherein said front sub-channel and said back sub-channel each has a constant depth for less than a length of said energy transfer portion.

10. An extruder screw with a feed end and discharge end for use in a single screw extruder that houses the screw rotatably in a cylindrical barrel for processing solid material to a molten state, the screw comprising:
    a core extending longitudinally between the feed end and the discharge end, said core having an outer surface and including an energy transfer portion;
    a helical first thread formed on said core defining with said outer surface a channel for receiving material to be processed;
    a helical second thread formed on said core in said channel and extending over said energy transfer portion of said core, said first thread and said second thread cooperating to divide said channel into a front sub-channel and a back sub-channel in said energy transfer portion;
    said energy transfer portion having a plurality of sequential baffler sections, each of said barrier sections having an associated predetermined longitudinal length in which said first thread and said second thread have different outer diameters whereby a difference between said outer diameters is an associated barrier clearance;
    wherein a ratio of said associated barrier clearance of one of said barrier sections to said associated barrier clearance of an adjacent one of said barrier sections is approximately inversely proportional to a ratio of said associated longitudinal length of said one barrier section to said associated longitudinal length of said adjacent one barrier section.

11. The extruder screw according to claim 10 wherein each of said front sub-channel and said back sub-channel varies in depth between a minimum depth and a maximum depth.

12. The extruder screw according to claim 10 wherein said first and second threads alternate between a larger wiping outer diameter and a smaller barrier outer diameter in successive ones of said barrier sections.

13. The extruder screw according to claim 10 wherein a width of said first thread generally corresponds to a width of said second thread in said energy transfer portion.

14. The extruder screw according to claim 13 wherein said width of said first thread in said energy transfer portion is less than another width of said first thread outside said energy transfer portion.

15. The extruder screw according to claim 10 wherein said front sub-channel has a constant depth at two spaced apart positions for a total length less than a length of said energy transfer portion and said back sub-channel has a constant depth for less than a length of said energy transfer portion.

16. An extruder screw with a feed end and discharge end for use in a single screw extruder that houses the screw rotatably in a cylindrical barrel for processing solid material to a molten state, the screw comprising:

a core extending longitudinally between the feed end and the discharge end, said core having an outer surface and including an energy transfer portion;

a helical first thread formed on said core defining with said outer surface a channel for receiving material to be processed;

a helical second thread formed on said core in said channel and extending over said energy transfer portion of said core, said first thread and said second thread cooperating to divide said channel into a front sub-channel and a back sub-channel in said energy transfer portion, said front sub-channel and said back sub-channel each having a constant depth for less than a length of said energy transfer portion;

said energy transfer portion having a plurality of sequential barrier sections, each of said barrier sections having an associated predetermined longitudinal length in which said first thread and said second thread have different outer diameters whereby a difference between said outer diameters is an associated barrier clearance;

wherein a ratio of said associated barrier clearance of each of said barrier sections to said associated barrier clearance of a one of said barrier sections next in sequence toward the discharge end is approximately inversely proportional to a ratio of said associated longitudinal length of said each barrier section to said associated longitudinal length of said next one barrier section.

17. The extruder screw according to claim 16 wherein each of said front sub-channel and said back sub-channel varies in depth between a minimum depth and a maximum depth.

18. The extruder screw according to claim 16 wherein said first and second threads alternate between a larger wiping outer diameter and a smaller barrier outer diameter in successive ones of said barrier sections.

19. The extruder screw according claim 16 wherein a width of said first thread generally corresponds to a width of said second thread in said energy transfer portion.

20. The extruder screw according to claim 19 wherein said width of said first thread in said energy transfer portion is less than another width of said first thread outside said energy transfer portion.

* * * * *